United States Patent Office 3,409,652
Patented Nov. 5, 1968

3,409,652
BIS(TRIORGANOTIN) SALTS OF DIBASIC ACIDS AND THE PREPARATION THEREOF
James A. Horrocks, Ipswich, England, assignor to Bakelite Xylonite Limited, a corporation of Great Britain
No Drawing. Filed Sept. 7, 1965, Ser. No. 485,580
Claims priority, application Great Britain, Sept. 11, 1964, 37,297/64
9 Claims. (Cl. 260—429.7)

ABSTRACT OF THE DISCLOSURE

This invention relates to a stabilizer composition for polymeric substances having the formula

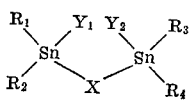

wherein $R_1$, $R_2$, $R_3$ and $R_4$ are members selected from the group consisting of alkyl, alkaryl, aralkyl and aryl radicals having from 2 to 20 carbon atoms, X is a dibasic divalent radical free from sulfur and $Y_1$ and $Y_2$ are each a monobasic radical selected from the group consisting of a monoester of a dibasic acid, a mercapto acid, a mercapto acid ester and a mercaptan.

---

The present invention relates to organo-tin compounds, methods for their manufacture, and polymeric compositions containing them.

Many organo-tin compounds have been prepared which have found use as stabilizers for polymeric compositions, for example for polyvinyl chloride. More recently, thio-tin compounds have been increasingly employed for this purpose. Some of these, however, have suffered from the disadvantage that polymeric compositions containing them have had an unpleasant odor, owing to the partial decomposition of the compound during processing. The compositions have also shown a tendency to discoloration after prolonged processing.

It is an object of the present invention to provide a new compoistion having improved resistance to discoloration during processing.

It is a further object of the invention to provide an improved stabilizer for polymeric compositions, especially polyvinyl chloride.

The present invention accordingly provides a stabilizer composition for polymeric substances, which comprises a product obtainable by reacting together one or more compounds of the formula

wherein $R_1$ and $R_2$, which may be the same or different, each represent an alkyl, alkaryl, aralkyl or aryl radical having from 2 to 20 carbon atoms, one or more compounds of the formula YH, wherein Y represents a monobasic radical other than the radical of a fatty acid, and one or more compounds of the formula $XH_2$, wherein X represents a saturated or unsaturated dibasic divalent radical free from sulphur.

The present invention further provides a process for the manufacture of a polymeric composition of improved stability, which comprises admixing a vinyl polymer, especially polyvinyl chloride or a vinyl chloride copolymer, with the stabilizer composition provided by the invention, and the polymeric composition produced thereby.

Advantageously, the composition contains from 1% to 5%, preferably about 2%, by weight of the reaction product, based on the weight of the polymer.

The stabilizer composition of the invention may suitably be prepared by heating the starting materials at a temperature and for a time sufficient to remove the water formed in the reaction, a temperature of 110° C. to 120° C. being generally suitable.

The reaction product normally comprises a compound of the Formula I

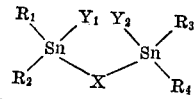

wherein $R_1$, $R_2$, $R_3$ and $R_4$, which may be the same or different, each represent an alkyl, aryl, alkaryl or aralkyl radical containing from 2 to 20 carbon atoms, advantageously alkyl radicals, and preferably n-butyl radicals.

X may represent the dibasic radicals of, for example, maleic, itaconic or malonic acids, while YH (or $Y_1H$ and $Y_2H$) may represent, for example, a monoester of a dibasic acid, a mercapto acid, a mercapto acid ester, or a mercaptan, among which there may be mentioned, more especially, 2-ethylhexyl maleate, 2-ethylhexyl thioglycollate, β-mercaptopropionic acid, phenyl-mercaptoacetic acid, and lauryl mercaptan. When X, $Y_1$ and $Y_2$ represent radicals free from sulfur, for example, if X represents a maleic acid radical, and $Y_1$ and $Y_2$ both represent 2-ethylhexyl maleate, a liquid stabilizer having good compatability with vinyl polymers may be obtained. If $Y_1$, for example, is a sulphur-containing radical, the resulting stabilizer has a similar action to the known sulphur-containing stabilizers, but a given degree of stabilization is achieved more cheaply.

When $Y_1$ and $Y_2$ are different and/or $R_1$, $R_2$, $R_3$ and $R_4$ are different, and/or X is an asymmetric radical, the stabilizer composition of the invention may comprise more than one compound of the general Formula I above, as well as one or more compounds not falling within the scope of the general formula. In general, it is preferred to react together stoichiometric quantities of starting materials for the production of a compound within the general Formula I.

The following examples illustrate the invention. In Examples 1 to 6, the compound named at the head of the example is believed to constitute, together with its isomers, a significant proportion of the reaction product, and to contribute largely to the stabilizing effect, although it is to be understood that the invention is in no way limited by such explanation of the products and their effects.

Example 1 (Stabilizer RV 59)

Composition comprising

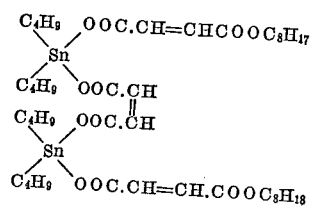

Bis (dibutyl tin 2-ethyl-hexyl maleate) maleate 26 gm. 2-ethylhexanol and 19.6 gm. maleic anhydride are heated at 110° C. until a clear liquid is obtained. Then 100 ml. of benzene and 24.8 gm. dibutyl tin oxide are added and the mixture refluxed in a Dean and Stark apparatus until 1.8 ml. $H_2O$ have been removed. 24.8 gm. dibutyl tin oxide are then added and the mixture heated at 80° C. until a clear solution is obtained. Then 9.8 gm. maleic anhydride are added and refluxed until a clear solution is obtained. The benzene is distilled off to give the product as a clear liquid. Refractive index 1.4822 at 25° C.

The stabilizing effect of the product is then compared with other stabilizers by milling on a two roll mill at 175° C.; samples were removed every 5 minutes for color comparison.

|  | 1 | 2 | 3 |
|---|---|---|---|
| Breon 202 | 100 | 100 | 100 |
| Stabilizer RV 59 | 2 | | |
| Dibutyl tin maleate | | 2 | |
| Dibutyl tin di-(2-ethylhexyl-thioglycollate) | | | 2 |
| Wax OP | 1/8 | 1/8 | 1/8 |

All three stabilizers gave approximately the same stability, e.g. Clear after 35 mins. but slightly yellow at 40 mins.

Breon 202 is a vinyl chloride/vinylidene chloride copolymer containing 4% vinylidene chloride and is manufactured by British Geon Ltd.

Example 2 (Stabilizer RV 61)

Composition containing

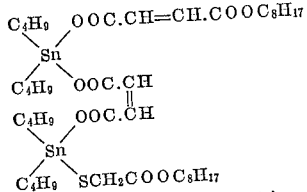

S-dibutyl tin mono (2 ethylhexyl thioglycollate) mono maleate salt of dibutyl tin mono (2-ethylhexyl maleate)

This stabilizer was prepared by reacting 0.20 mole dibutyl tin oxide, 0.10 mole maleic anhydride, 0.098 mole 2 ethylhexyl thioglycollate, 0.098 mole 2 ethylhexyl maleate. These were mixed together with stirring and heated at 120° C. until all water had been evolved. The product was a clear yellow slightly viscous liquid. Ref. Index 1.5110 at 25° C. (measured on an Abbe refractometer).

This was then tested as a stabilizer by incorporating into polyvinyl chloride and milling on a two roll mill at 175° C. removing samples every 5 minutes to compare color.

|  | 1 | 2 |
|---|---|---|
| Vybak DVY 18 | 100 | 100 |
| Stabilizer RV 61 | | 2 |
| Dibutyl tin maleate | 2 | |
| Wax OP | 1 | 1 |

Stabilizer RV 61 gave a glass clear color after 60 mins. whilst dibutyl tin maleate gave a yellow color after 35 mins. No plate out occurred.

Vybak DVY 18 is polyvinyl chloride manufactured by Bakelite Limited.

Example 3 (stabilizer RV 60)

Composition comprising

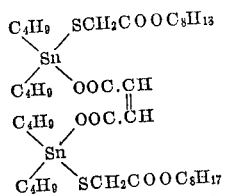

S-dibutyl tin mono (2 ethylhexyl thioglycollate) mono maleic acid salt of S-dibutyl tin mono (2 ethylhexyl thioglycollate)

This was prepared using the procedure of Example 2, by reacting 0.02 mole dibutyl tin oxide, 0.100 mole maleic anhydride, and 0.196 mole 2-ethylhexyl thioglycollate. The product was a clear yellow slightly viscous liquid. Ref. Index 1.5110.

This was then tested in Vybak DVY 18 against dibutyl tin maleate. The compound stabilized with dibutyl tin maleate turned yellow after 35 mins. whilst that stabilized with RV 60 was clear after 60 mins.

Again no plate out occurred.

Example 4 (Stabilizer RV 61A)

Composition containing S-dibutyl tin mono (2-ethylhexyl thioglycollate) mono maleic acid salt of dibutyl tin 2-ethylhexyl maleate.

This product was prepared by reacting 248.9 gm. dibutyl tin oxide, 102.1 gm. 2-ethylhexyl thioglycollate, 49 gm. maleic anhydride and 114 gm. 2-ethylhexyl maleate. These were mixed together with stirring and heated at 120° C. until all water had been evolved. The product was a yellow liquid. Refractive Index at 25° C.=1.5062.

Example 5 (Stabilizer RV 62)

Composition comprising dibutyl tin mono (2-ethylhexyl maleate) mono maleic acid salt of dibutyl tin phenyl mercapto acetate.

This product was prepared by reacting 248.9 gm. dibutyl tin oxide, 84.1 gm. phenylmercaptoacetic acid, 49 gm. maleic anhydroxide and 114 gm. 2-ethylhexyl maleate. These were mixed together with stirring and heated at 120° C. until all water had been evolved. The product was pale yellow liquid. Refractive Index at 25° C.=1.5235.

Example 6 (Stabilizer RV 63)

Composition comprising dibutyl tin mono (2-ethylhexyl maleate) mono malonic acid salt of dibutyl tin phenyl-mercaptoacetic acid.

This compound was prepared by reacting together 248.9 gm. dibutyl tin oxide, 52.02 gm. malonic acid, 114 gm. 2-ethylhexyl maleate, and 84.1 gm. phenylmercaptoacetic acid. These were mixed together with stirring and heated at 120° C. until all water had been evolved. The product was a pale yellow liquid. Refractive Index at 25° C.=1.5211.

Example 7

All the above stabilizers of Examples 4 to 6 were incorporated into a polyvinyl chloride composition by milling and using the following formulation:

| | Parts by weight |
|---|---|
| Breon 202 resin | 100 |
| Stabilizer | 2 |
| Wax | 1.5 |

Each composition was milled on a two roll mill at 175° C. removing samples every 5 minutes to observe color development.

The compositions were compared with dibutyl tin maleate as a standard stabilizer.

RESULTS

| Stabilizer: | Time taken for initial color, mins. |
|---|---|
| Dibutyl tin maleate | 35 |
| RV 61A | 40 |
| RV 62 | 60 |
| RV 63 | 60 |

No plate out occurred with any of the stabilizers of this invention.

What is claimed is:
1. A stabilizer composition for polymeric substances, which comprises one or more water-free compounds of the formula

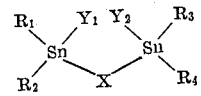

wherein $R_1$, $R_2$, $R_3$ and $R_4$, are selected from the group consisting of alkyl, alkaryl, aralkyl or aryl radical having from 2 to 20 carbon atoms, $Y_1$ and $Y_2$, each represent a monobasic radical other than the radical of a fatty acid, and X represents a saturated or unsaturated dibasic divalent radical free from sulphur.

2. The composition of claim 1 wherein $R_1$, $R_2$, $R_3$ and $R_4$ are n-butyl radicals.

3. The stabilizer composition of claim 1 wherein X is a dibasic radical of compounds having 2 to 20 carbon atoms and having terminal groups selected from the group consisting carboxyl and hydroxyl.

4. The stabilizer composition of claim 1 wherein X is a dibasic radical of compounds selected from the group consisting of malonic acid, maleic acid or itaconic acid.

5. The stabilizer composition of claim 1 wherein $Y_1$ or $Y_2$ are monobasic radicals of compounds having 2 to 20 carbon atoms and having terminal groups selected from the group consisting of carboxyl, hydroxyl and mercaptan.

6. The stabilizer composition of claim 1 wherein $Y_1$ or $Y_2$ are monobasic radicals of compounds selected from the group consisting of 2-ethylhexyl maleate, 2-ethylhexyl thioglycollate, β-mercaptoproprionic acid, phenylmercaptopropionic acid or of lauryl mercaptan.

7. A process for the manufacture of a stabilizer composition having the formula

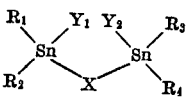

wherein $R_1$, $R_2$, $R_3$ and $R_4$ are selected from the groups consisting of alkyl, alkaryl, aralkyl and aryl radical having from 2 to 20 carbon atoms, $Y_1$ and $Y_2$ are monobasic monovalent radicals other than radicals of a fatty acid and X is a dibasic, divalent radical free from sulfur which comprises reacting together at least one compound of the formula

at least one compound of the formula

at least one compound of the formula YH and at least one compound of the formula $XH_2$ at a temperature and for a time sufficient to remove the water formed during the reaction to obtain a reaction product which includes said stabilizer composition.

8. The process of claim 7 wherein said temperature is between 90° C. and 120° C.

9. A product made by the process of claim 7.

References Cited

UNITED STATES PATENTS 2,857,413  10/1958  Weinberg _____ 260—429.7

TOBIAS E. LEVOW, *Primary Examiner.*

W. F. W. BELLAMY, *Assistant Examiner.*